Figure 1:
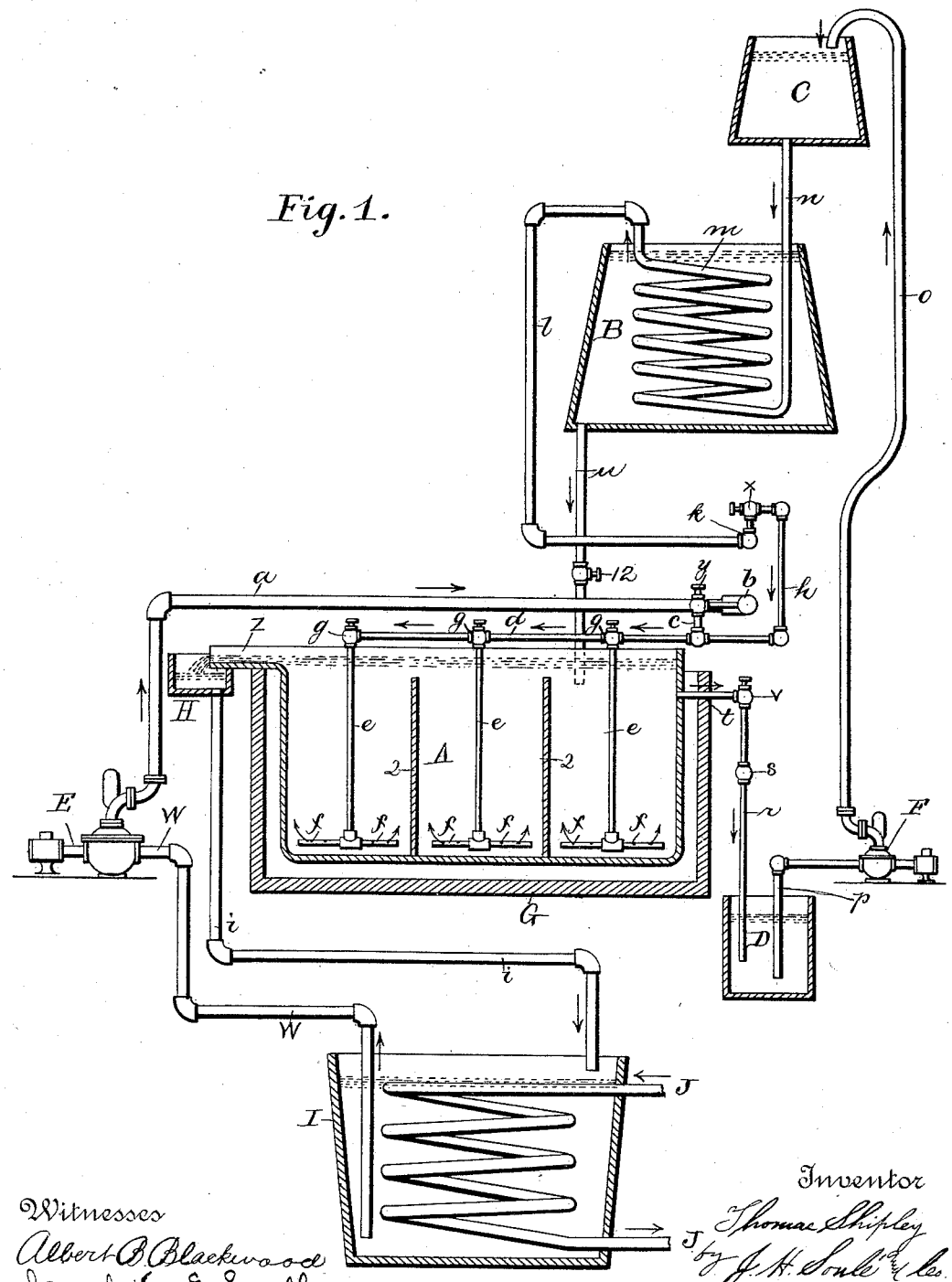

(No Model.) 2 Sheets—Sheet 1.

T. SHIPLEY.
APPARATUS FOR MAKING ICE.

No. 476,832. Patented June 14, 1892.

Witnesses
Albert B. Blackwood
Carleton E. Snell

Inventor
Thomas Shipley
by J. H. Soule & Co.
his attorneys

THE NORRIS PETERS CO., PHOTO-LITHO., WASHINGTON, D. C.

(No Model.) 2 Sheets—Sheet 2.

T. SHIPLEY.
APPARATUS FOR MAKING ICE.

No. 476,832. Patented June 14, 1892.

Witnesses
Albert B. Blackwood
Carleton E. Snell

Inventor
Thomas Shipley
By his Attorneys
J. H. Soule & Co.

UNITED STATES PATENT OFFICE.

THOMAS SHIPLEY, OF CINCINNATI, OHIO, ASSIGNOR OF ONE-HALF TO LOUIS J. DOLLE, OF SAME PLACE.

APPARATUS FOR MAKING ICE.

SPECIFICATION forming part of Letters Patent No. 476,832, dated June 14, 1892.

Application filed September 25, 1891. Serial No. 406,867. (No model.)

*To all whom it may concern:*

Be it known that I, THOMAS SHIPLEY, of Cincinnati, in the county of Hamilton and State of Ohio, have invented certain new and useful Improvements in Apparatus for Making Ice, of which the following is a specification.

My invention relates to that part of the manufacture of ice known as the "freezing system" and to that particular method known as the "plate system."

Heretofore in the plate system of freezing two methods and constructions have been ordinarily employed. According to one method, which is illustrated, for example, in Letters Patent of the United States granted to David Boyle May 11, 1875, No. 163,143, a tank is employed containing the liquid to be frozen, in which are placed hollow freezing-plates, each of which is divided by horizontal partitions or "baffle-plates," so as to provide a circuitous passage. A non-congealable fluid—such as brine—is cooled in a separate refrigerating-tank, and the brine is circulated continuously through the hollow freezing-plates. There are two practical disadvantages to this method and construction. The baffle-plates compel the brine to turn sharp corners, and in this manner eddies are formed which prevent the free circulation of the brine and the salt in the brine rapidly deposits in the corners, thus closing the further passage of the brine. The second disadvantage arises when it is required to remove the ice from the hollow plates. To enable this to be done, the brine is drawn off from the freezing-plates and water of ordinary temperature is introduced in its stead within the plates and allowed to stay there until the ice is thawed from the plates. It usually requires two or more fillings of this water before the ice is loosened, the water being drawn off each time and fresh water put in. This is considerable labor and requires the careful attention of some one well versed in this art. When the ice is taken away and before the freezing process can be continued, the water within the plates must be drawn off and the non-congealable fluid again put into the plates. This makes at least four times that the liquid in the plates has been handled, necessitating the manipulation of a large number of valves and pumps. The losses incurred thereby are a considerable quantity of the non-congealable fluid, owing to the fact that the plates cannot be entirely drained, and also all the cold that has been taken out of the plates to thaw the ice has been wasted. These losses, with the time used up in thawing off the ice, add considerably to the cost of the plant and the operation of it. The second method or construction is illustrated, for example, in Letters Patent of the United States granted to John P. Jones April 9, 1878, No. 202,265. According to this method and construction the hollow freezing-plate is filled with brine, glycerine, or similar non-congealable liquid, and the brine is cooled within the plate by a refrigerant passing through a coil within the plate. In the freezing operation there is no circulation of the glycerine. When, however, the freezing is accomplished, the thawing of the ice is effected by withdrawing the glycerine within the freezing-plate and introducing glycerine of ordinary temperature, the refrigerant of course being shut off. The thawing is thus effected by the same character of liquid as is the freezing. In this system, however, the cold to which the glycerine has been reduced in freezing is lost.

The present invention relates to the class of ice-machines similar to that of the Boyle patent above named; and the object of the invention is to improve the construction of the hollow freezing-plates so as to facilitate the circulation of the brine and to avoid the loss of cold in thawing out the plates.

In the present improved apparatus the cooling of the non-congealable fluid is effected in a separate refrigerating-tank, similar to the ordinary brine-tank used in refrigerating plants. This fluid is circulated in a vertical direction through plates made specially for this purpose by a pump or other means and is conducted back to the separate refrigerating-tank to be recooled. When the ice has attained the desired thickness on the plates, the supply of cold non-congealable fluid is shut off and some of the same non-congealable fluid which has been kept at the ordinary temperature of the atmosphere in a tank that is in the highest part of the buildings is turned on and circulated in the plates through a system of piping and tanks so arranged that the cold picked up in the plates is deposited in the water to be frozen. This thawing process, using the same non-congealable fluid, saves the loss of this fluid and the circulation, once started, continues until the ice is thawed loose. The non-congealable fluid used to thaw the ice being circulated through the water to be frozen in coils of pipe (or in any other manner) and imparting to that water the cold taken up in the plates saves this cold, which has been produced at the expense of coal and water, thereby effecting a very considerable saving.

The invention further consists of a new construction of the hollow plate used to freeze this ice. The brine is introduced at the bottom of the plates and circulates upwardly therethrough. The hollow plate has an iron frame, to which the side sheets are securely and permanently fastened, and has a projecting nozzle or other means at its upper part for delivering the non-congealable fluid into a conduit, which takes it back to the refrigerating-tank, wherein it is cooled; also, means by which the fluid may be returned to the tank, where that portion of the fluid used to thaw the ice is stored. The plates are kept from bulging by vertical braces, which act as partitions and distribute the non-congealing fluid over the surface of the plate. The top of the plate has a series of braces, which allow of the distributing-pipes being run through them.

The invention further consists of the peculiar construction, connections, and arrangements of the several parts of this apparatus described and shown and their combination one with the other.

To enable others skilled in the art to which my invention relates to make use of the same, I will now proceed to describe its construction and manner of operation.

Figure 2:
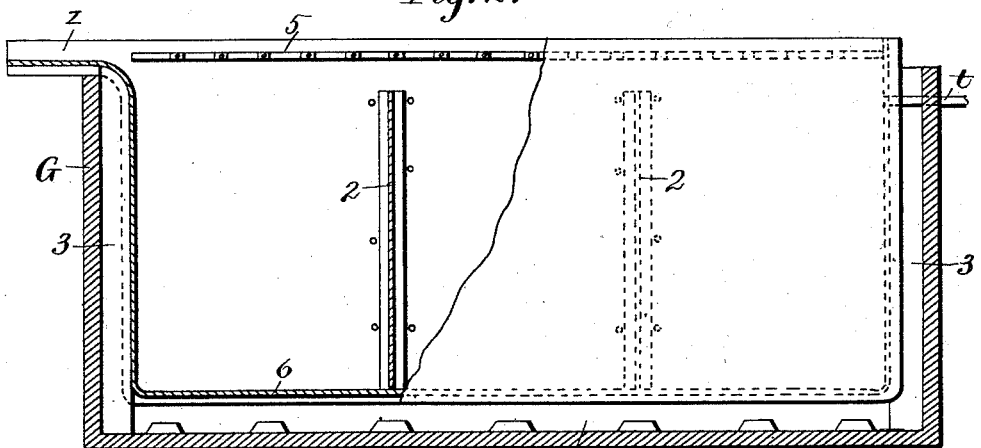
Figure 3:
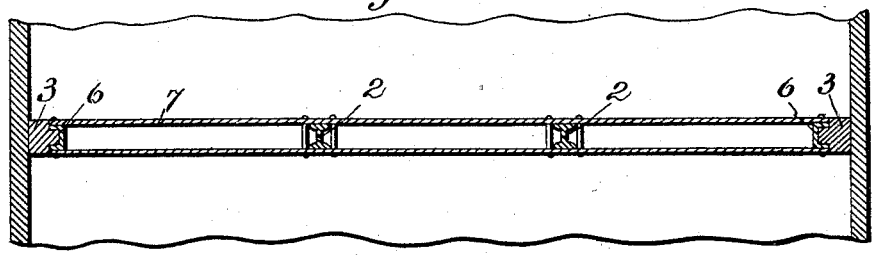
Figure 4:
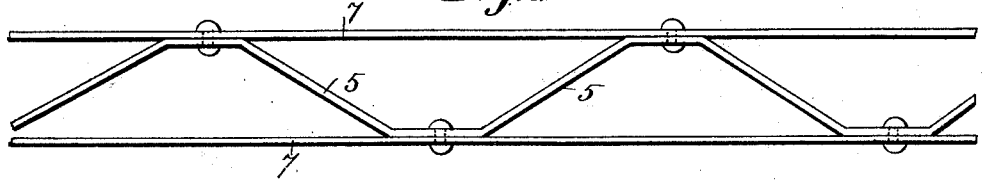

Referring to the drawings, Figure 1 shows the system used to operate the freezing and thawing of the ice. Fig. 2 shows a side view of the plate. Fig. 3 shows a sectional plan view of the plate. Fig. 4 shows one method of bracing the top of the plate.

In Fig. 1, A is the hollow plate upon the exterior of which the ice is frozen, said plate being immersed in a freezing-tank G, which is filled to the desired height with the water to be frozen. B is the water-supply tank or reservoir in which the water to be frozen is stored. The water to be frozen is conveyed from supply-tank B by pipe $u$, controlled by a cock 12, to the freezing-tank G, the water occupying the space in said tank exterior to the hollow plates A. C is the storage-tank or reservoir in which the thawing-fluid is stored. I is the refrigerator in which the non-congealable fluid is cooled. The cooling is effected by passing a refrigerant—such as anhydrous ammonia—through the coils J in the refrigerator I.

The operation of freezing is as follows: The pump E, being connected on the suction side by the pipe W to the refrigerator I, where the non-congealing fluid is cooled, discharges this fluid, which I will call "brine," through a pipe $a$ to the main distributing-pipe $b$, where it passes through the regulating-valve $y$ and pipe $c$ to the header $d$, from whence it passes through the valves $g$ and pipes $e$ to the perforated pipes $f$, where it is distributed along the bottom of the hollow plate A, coming in contact with the sides of the plate and arising to the top and flowing through nozzle $z$ into the conduit H, from which it is carried back by pipe $i$ to the refrigerator, in which it is again cooled and again circulated through the systems.

The operation of thawing is as follows: The valve $y$ is closed, shutting off the brine from the general system, and the valve $v$ is then opened. This connection being below the main outlet $z$ draws the brine off to its level and allows it to pass through the pipe $t$ to the header $s$ and pipe $r$ to the cistern D, from whence it is sucked by the pump F through pipe $p$ and discharged through the pipe $o$ into the storage-tank C. When this has been started, the valve $x$ is opened and the brine from storage-tank C allowed to flow through the coils $m$ in water-supply tank B in operative contact with the water within said tank, where it delivers its cold to the water, thence through pipe $l$ to distributing-pipe $k$, valve $x$, pipes $h$, $d$, and $e$ to perforated pipes $f$, thence to outlet-pipe $t$, valve $v$, pipes $s$ and $r$ to cistern D, from where it is pumped to storage-tank C and again circulated, as before, until the ice comes loose from the plate.

Figs. 2, 3, and 4 show the details of the plate. This plate is constructed by taking two metallic sheets and riveting or bolting them to an iron frame, this frame extending up both ends and along the bottom, the top being left open, and is braced to resist the bulging strain caused by the difference in weight between the brine inside and the water outside. One style of bracing the top is shown by Fig. 4, wherein diagonal braces 5 extend across the hollow plate and are bolted to the sheets 7 7, constituting the sides of the hollow plate. These braces 5 5 are also shown in Figs. 2 and 4. The sheets are also braced vertically by the eye-beams 2, they forming partitions in the plate and helping to insure an equal distribution of the brine. These eye-beams are secured by screw or socket bolts, which pass through the sheets 7 on either side. The projecting nozzle $z$ may be part of the sheets 7 or be riveted onto them. Another method might be adopted by making both ends of the plate alike—square—and a pipe put in place of a nozzle. The pipe $t$ is placed about six inches below the level of the bottom of the nozzle $z$ to insure a circulation in its direction without making it necessary to shut up the nozzle when the ice is being thawed from the plates. The plates are kept away from the sides of the tank G by fitting in the posts 3 and from the bottom by fitting in the timber 4.

It will be seen from the above description that the operation of this system, as shown, is extremely simple, and that to start the plates in operation it is only necessary to open the valve $y$ and all other parts take care of themselves until the ice is of desired thickness, when valve $y$ is closed and valves $v$ and $x$ opened and the thawing process immediately begins without loss of cold, as the cold brine then in the bottom plates is circulated through the tank containing the water to be frozen, thereby reducing the temperature of the water and increasing the temperature of the brine. The brine then passes down through the plates again and picks up more cold, which is again taken up by the water, as before. This insures a rapid but equal thawing of the ice and prevents its cracking, which is frequently the case in other systems.

Having thus fully described my invention, what I claim, and desire to secure by Letters Patent, is—

1. A hollow freezing-plate for containing a non-congealable fluid and upon the outer faces of which ice is frozen, said freezing-plate having inlets for the non-congealable fluid along its bottom, having no horizontal partitions or plates, and having an outlet for the non-congealable fluid at its upper part, whereby the non-congealable fluid circulates upwardly through the plate, substantially as set forth.

2. A hollow freezing-plate for containing a non-congealable fluid and upon the outer faces of which ice is frozen, said freezing-plate having inlets for the non-congealable fluid along its bottom, having no horizontal partitions or plates, having vertically-extending partitions, and having an outlet for the non-congealable liquid at its upper part, whereby the non-congealable fluid circulates upwardly uniformly through the plate, substantially as set forth.

3. A hollow freezing-plate having vertical partitions 2 2 and outlet $z$ at its upper part, in combination with perforated pipes $f$ (the perforations of which constitute inlets for the non-congealable fluid) at the bottom of the plate, and pipes $e$ and $d$ for conveying the non-congealable fluid to the pipes $f$, substantially as set forth.

4. The combination of the refrigerating-tank I, a plurality of freezing-plates having discharge-nozzles, the conduit H, into which all of the freezing-plates discharge, a return-pipe $i$, leading from the conduit H to the tank I, the supply-pipe W, leading from tank I to the freezing-plates, and the pump E in pipe W, substantially as set forth.

5. A freezing-plate having a main outlet near the top, a secondary outlet below the level of said main outlet, and a valve controlling said secondary outlet, whereby the non-congealable fluid within the freezing-plate can be drawn off to the level of said secondary outlet, substantially as set forth.

6. A freezing-tank containing the liquid to be frozen, a supply-tank for holding the liquid to be frozen preparatory to its being introduced into said freezing-tank, and a hollow freezing-plate within said freezing-tank, upon the exterior surfaces of which the liquid within said freezing-tank is frozen, in combination with a non-congealable-fluid circuit which conducts a non-congealable fluid from the interior of said hollow freezing-plate into operative contact with the fluid in said supply-tank, (whereby the temperature of said non-congealable fluid is raised above the freezing-point, thus changing said fluid from a freezing medium into a thawing medium and at the same time lowering the temperature of the liquid to be subsequently frozen in said supply-tank,) and thence back to said hollow plate, and means for conveying said non-congealable fluid through said circuit, substantially as set forth.

7. A freezing-tank containing the liquid to be frozen, a hollow freezing-plate within said tank, upon the exterior surfaces of which the liquid within said freezing-tank is frozen, a refrigerator where a non-congealable fluid is cooled below the freezing-temperature, means for conveying said non-congealable fluid in circuit from said refrigerator to and through said hollow freezing-plate, thereby effecting the freezing of the liquid in said freezing-tank and back to said refrigerator, and means for cutting off said circuit, in combination with a supply-tank for holding the liquid to be frozen preparatory to its being introduced into said freezing-tank, a non-congealable-fluid circuit which conducts a non-congealable fluid from the interior of said hollow plate into operative contact with the fluid in said supply-tank, (whereby the temperature of said non-congealable fluid is raised above the freezing-point, thus changing said fluid from a freezing medium to a thawing medium and at the same time lowering the temperature of the liquid to be subsequently frozen in said supply-tank,) and thence back to said hollow plate, means for conveying said non-congealable fluid through said circuit, and means for cutting off said circuit, substantially as set forth.

THOS. SHIPLEY.

Witnesses:
R. H. LINDEMANN,
CHAS. F. DOLLE.